(12) United States Patent
Jin et al.

(10) Patent No.: US 8,761,107 B2
(45) Date of Patent: Jun. 24, 2014

(54) METHOD AND APPARATUS FOR MAINTAINING TRAFFIC CONTINUITY

(75) Inventors: Weisheng Jin, Shenzhen (CN);
Xiaoying Xu, Shenzhen (CN); Min Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 133 days.

(21) Appl. No.: 13/467,848

(22) Filed: May 9, 2012

(65) Prior Publication Data

US 2012/0224476 A1    Sep. 6, 2012

Related U.S. Application Data

(63) Continuation of application No. PCT/CN2010/077433, filed on Sep. 29, 2010.

(30) Foreign Application Priority Data

Nov. 9, 2009 (CN) .......................... 2009 1 0110056

(51) Int. Cl.
*H04W 4/00* (2009.01)

(52) U.S. Cl.
USPC ............ 370/329; 370/341; 455/458; 455/560

(58) Field of Classification Search
CPC ...... H04L 29/06068; H04L 41/0226; H04L 67/2823; H04L 65/605; H04W 68/00; H04W 68/02; H04W 68/005; H04W 76/04
USPC ......... 370/229, 310, 328, 331, 332, 338, 401, 370/493, 329, 341; 455/458, 560
See application file for complete search history.

(56) References Cited

U.S. PATENT DOCUMENTS 7,020,477 B2    3/2006    Cramby et al.
7,400,593 B2 *  7/2008    Choi et al. ..................... 370/310

(Continued)

FOREIGN PATENT DOCUMENTS

CN    1859779 A      11/2006
CN    101572943 A    11/2009

(Continued)

OTHER PUBLICATIONS

International Search Report and Written Opinion received in Patent Cooperation Treaty Application No. PCT/CN2010/077433, mailed Dec. 23, 2010, 9 pages.

(Continued)

*Primary Examiner* — Jeffrey M Rutkowski
*Assistant Examiner* — Harun Chowdhury
(74) *Attorney, Agent, or Firm* — Slater & Matsil, L.L.P.

(57) ABSTRACT

A method for maintaining traffic continuity through a Traffic Offload Function (TOF) entity includes the following steps: the TOF entity receives a downlink packet of offload traffic of a User Equipment (UE), where the downlink packet of the offload traffic is sent by a Packet Data Network (PDN); the TOF entity sends a Core Network (CN) paging message to the UE; the TOF entity receives a paging response sent by the UE to the CN, where the paging response includes a service request message of the UE; and the TOF entity forwards the service request message to the CN so that the CN sets up a Radio Access Bearer (RAB) after the service request message is received. With the method, the communication between the CN and the UE can be restored to guarantee the transmission of traffic. Accordingly, a TOF entity is also disclosed according to the present invention.

14 Claims, 7 Drawing Sheets

(56) References Cited

U.S. PATENT DOCUMENTS

| | | | |
|---|---|---|---|
| 7,526,320 B2* | 4/2009 | Semper | 455/560 |
| 2006/0040681 A1* | 2/2006 | Julka et al. | 455/458 |
| 2008/0057961 A1* | 3/2008 | Sun et al. | 455/436 |
| 2010/0210288 A1* | 8/2010 | Kim et al. | 455/458 |
| 2010/0284387 A1* | 11/2010 | Zhao et al. | 370/338 |

FOREIGN PATENT DOCUMENTS

| | | |
|---|---|---|
| CN | 102118789 A | 7/2011 |
| EP | 1739860 A1 | 1/2007 |
| WO | WO 2011/054241 A1 | 5/2011 |

OTHER PUBLICATIONS

3rd Generation Partnership Project; Technical Specification Group Services and System Aspects; General Packet Radio Service (GPRS); Service Description; Stage 2 (Release 8), 3GPP TS 23.060 v8.6.0, Sep. 2009, 279 pages.

3rd Generation Partnership Project; Technical Specification Group Services and System Aspects; General Packet Radio Service (GPRS) Enhancements for Evolved Universal Terrestrial Radio Access Network (E-UTRAN) Access (Release 9), 3GPP TS 23.401 v9.2.0, Sep. 2009, 245 pages.

3rd Generation Partnership Project; Technical Specification Group Services and System Aspects; Local IP Access and Selected IP Traffic Offload (Release 10), 3GPP TR 23.829 v0.2.1, Sep. 2009, 19 pages).

3rd Generation Partnership Project; Technical Specification Group Services and System Aspects; Local IP Access and Selected IP Traffic Offload (Release 10), 3GPP TR 23.829 v0.3.0, Nov. 2009, 26 pages.

Chinese Search Report received in Application No. 200910110056.1 mailed Jul. 24, 2012, 5 pages. (Partial Translation).

Huawei, "Selected IP Traffic Offload for UMTS at Iu-PS," 3GPP TSG SA WG2 Meeting #75, TD S2-096067, Kyoto, Japan, Aug. 31-Sep. 4, 2009, 5 pages.

Huawei, et al., "Architectural Requirements of Internet Offload," 3GPP TSG SA WG2 Meeting #75, TD S2-095146, Kyoto, Japan, Aug. 31-Sep. 4, 2009, 3 pages.

* cited by examiner

* it can be several responses

METHOD AND APPARATUS FOR MAINTAINING TRAFFIC CONTINUITY

This application is a continuation of International Application No. PCT/CN2010/077433, filed on Sep. 29, 2010, which claims priority to Chinese Patent Application No. 200910110056.1, filed on Nov. 9, 2009, both of which are hereby incorporated by reference in their entireties.

TECHNICAL FIELD

The present invention relates to the communications field, and in particular, to the field of communication traffic data transport.

BACKGROUND

With the evolution of the 3rd Generation (3G) air interface technologies, the transmission speed of the air interface is greatly increased and the throughput of Packet Switched (PS, Packet Switched) traffic is multiplied. Core Net (CN, Core Net) nodes such as the Serving GPRS Support Node (SGSN) and Gateway GPRS Support Node (GGSN), value-added servers (VASs), and the transport bearers between the nodes are faced with unprecedented loads. Taking the Internet with rich contents for example, Internet traffic imposes higher requirements on the transmission bandwidth of the CN, so that the cost of capacity expansion rises rapidly. The Internet traffic occupies many transport resources of the mobile network but creates low profit for the mobile operator. Furthermore, when a user accesses an Internet service via a Packet Data Network (PDN, Packet Data Network), data packets need to pass through many CN nodes, so that the efficiency of transmission is low.

To relieve the bearing burden of CN nodes and increase the packet transmission efficiency of PS services, the existing technical solution adds a logical function between a Radio Network Controller (RNC) and an SGSN to offload data traffic flows of a user. This logical function is a Traffic Offload Function (TOF) which routes uplink Internet traffic directly to a PDN in a low-cost manner at a node close to the access network, and routes downlink traffic from the PDN directly to the access network, so as to offload the data traffic on the CN. FIG. 1 illustrates a network architecture of this solution. In FIG. 1, the TOF is a logical function. In embodiments of the present invention, the entity in which a TOF is deployed is described as a TOF entity. The TOF entity may be deployed on the Iu-PS interface between an RNC or a Home NodeB Gateway (HNB GW) and an SGSN in a Universal Mobile Telecommunications System (UMTS). The TOF entity provides a standard Iu interface to both the RNC/HNB GW (RNC or HNB GW) and the SGSN and provides a Gi interface to fulfill the traffic offload function. The Charging Gateway (CG) and Lawful Interception Gateway (LIG) provide open interfaces to the TOF. To further reduce the transport bearers between the RNC/HNB GW and the TOF, the TOF can be integrated with the RNC/HNB GW.

In the prior art, for a network that uses a traffic offload function, if the state of a User Equipment (UE) changes, for example, changes from an active state to an idle state, or if the parameters stored by the TOF entity are updated, the communication between the CN and the UE will be interrupted. For example, if the UE is attached to the network via TOF entity 1, when the UE moves from TOF entity 1 to TOF entity 2 (TOF2) in the idle state, the UE initiates a traffic offload service request and enables the traffic offload. Afterwards, the UE that changes to the idle state receives downlink packets of the offload traffic under TOF 2. At this time, TOF 2 must page the UE and restore the data transmission of the UE to support traffic continuity. That is, if traffic is offloaded at TOF 2, the UE is using the traffic offload before the UE changes to the idle state. When no data transmission exists for a period of time, the air interface resource will be released and enters into the idle state. However, the application connection is not released, and the TOF will probably still receive the downlink packets of the offload traffic. To guarantee the service can be used continuously, the TOF needs to instruct the UE to set up a bearer with the network. Or, the UE does not move to TOF 2 and remains at TOF 1 but the state of the UE has changed. For example, after the traffic offload of the TOF is completed, the UE enters into the idle state. At this time, the air interface resource between the UE and the CN is also released. However, because the application connection is not released, when the UE receives new packets of the offload traffic again, the UE needs to restore the connection with the CN to implement the transmission of packets of the offload traffic.

From the above description, the TOF traffic offload causes communication interruption between the CN and the UE because of the release of the air interface resource.

SUMMARY OF THE INVENTION

For the issue of communication interruption between a CN and a UE caused by use of a TOF in the prior art, embodiments of the present invention provide a method for maintaining traffic continuity and correspondingly provide a TOF entity to solve the issue.

In one aspect, an embodiment of the present invention provides a method for maintaining traffic continuity, where the method includes:
  receiving, by a TOF entity, a downlink packet of a offload traffic of a UE, where the downlink packet of the offload traffic is sent by a Packet Data Network (PDN);
  sending, by the TOF entity, a CN paging message to the UE;
  receiving, by the TOF entity, a paging response sent by the UE to the CN, where the paging response includes a service request message of the UE and the service request message includes a Service Type field indicative of the paging response; and
  forwarding, by the TOF entity, the service request message to the CN for the CN to set up a Radio Access Bearer (RAB) after the service request message is received, where the Service Type field indicates a data content (Data).

Through the method, the communication between the CN and the UE can be implemented to guarantee the transmission of traffic.

In another aspect, an embodiment of the present invention provides a TOF entity includes:
  a paging initiating module, configured to send a CN paging message to a UE and receive a paging response sent by the UE to the CN; and
  a service request forwarding module, configured to forward a service request message in the paging response to the CN for setup of a communication connection between the CN and the UE to ensure traffic continuity; and
  a service request message forwarding module, configured to forward a service request message in the paging response to the CN for setup of a communication connection between the CN and the UE, where a Service Type field in the service request message indicates a data content (Data).

In the embodiments of the present invention, the paging response is sent to the CN through the TOF entity, and under the condition that the state of the UE is changed, the communication between the CN and the UE can be restored to ensure the continuity of a communication service.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

To make the objectives, technical solutions, and benefits of the present invention clearer, the present invention will be described in further detail with reference to the accompanying drawings and embodiments.

Figure 1:
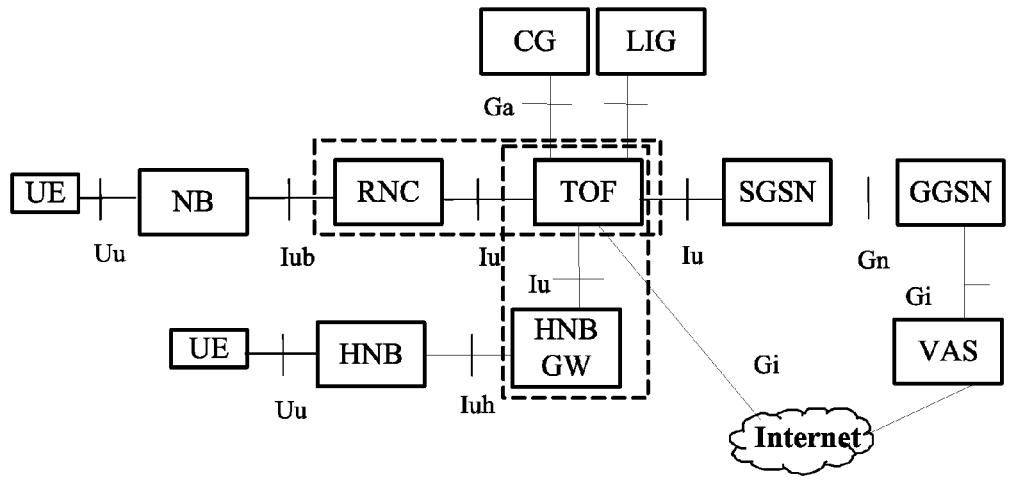
FIG. 1 is a network architecture of traffic offload of a TOF entity on an Iu-PS interface in the prior art.
Figure 2:
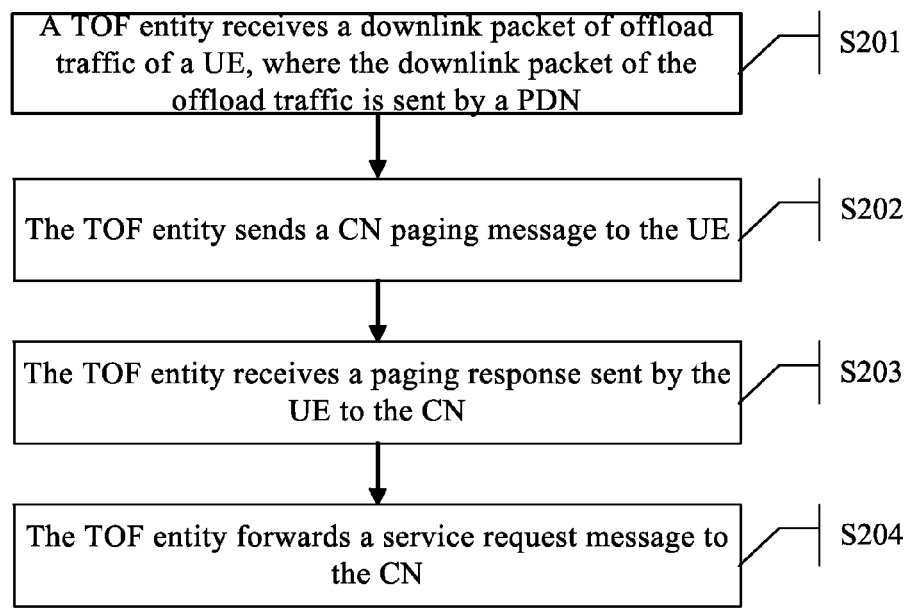
FIG. 2 is a flowchart of a first embodiment of the present invention.

As shown in FIG. 2, a first embodiment of the present invention includes the following steps:

S201. A TOF entity receives a downlink packet of an offload traffic of a UE, where the downlink packet of the offload traffic is sent by a PDN.

Specifically, the downlink packet of the offload traffic can be received via a Gi interface.

S202. The TOF entity sends a CN paging message to the UE.

Specifically, for example, the TOF finds that the UE enters into an idle state, and in order to transmit traffic to the UE, the TOF needs to page the UE to restore setup of the bearer between the CN and the UE.

S203. The TOF entity receives a paging response sent by the UE to the CN. The paging response may include a service request message of the UE, and the service request message includes a Service Type field that is indicative of the paging response.

S204. The TOF entity forwards the service request message to the CN so that the CN sets up a RAB after the service request message is received. The Service Type field indicates a data content or signaling content (Data).

The specific procedure that the TOF entity sends the CN paging message to the UE in step S202 and the specific procedure that a paging response is received in step S203 correspond to specific functions of a paging initiating module of the TOF entity in an apparatus embodiment of the present invention. Step S204 in which the TOF entity forwards the service request message to the CN corresponds to a service request message forwarding module of the TOF entity.

Specifically, the CN receives the service request message forwarded by the TOF entity and finds that the type of the service request is Data according to the value of the Service Type field Data in the service request message. Then the CN needs to set up a bearer with the UE to transmit service data. For example, the CN may initiate a RAB assignment procedure, and establish communication with the UE by establishing a RAB.

Therefore, through the UE paging procedure provided in the first embodiment of the present invention and initiated by the TOF, it may be implemented that a radio bearer is set up between the CN and the UE to transmit service data and maintain traffic continuity.

Figure 3:
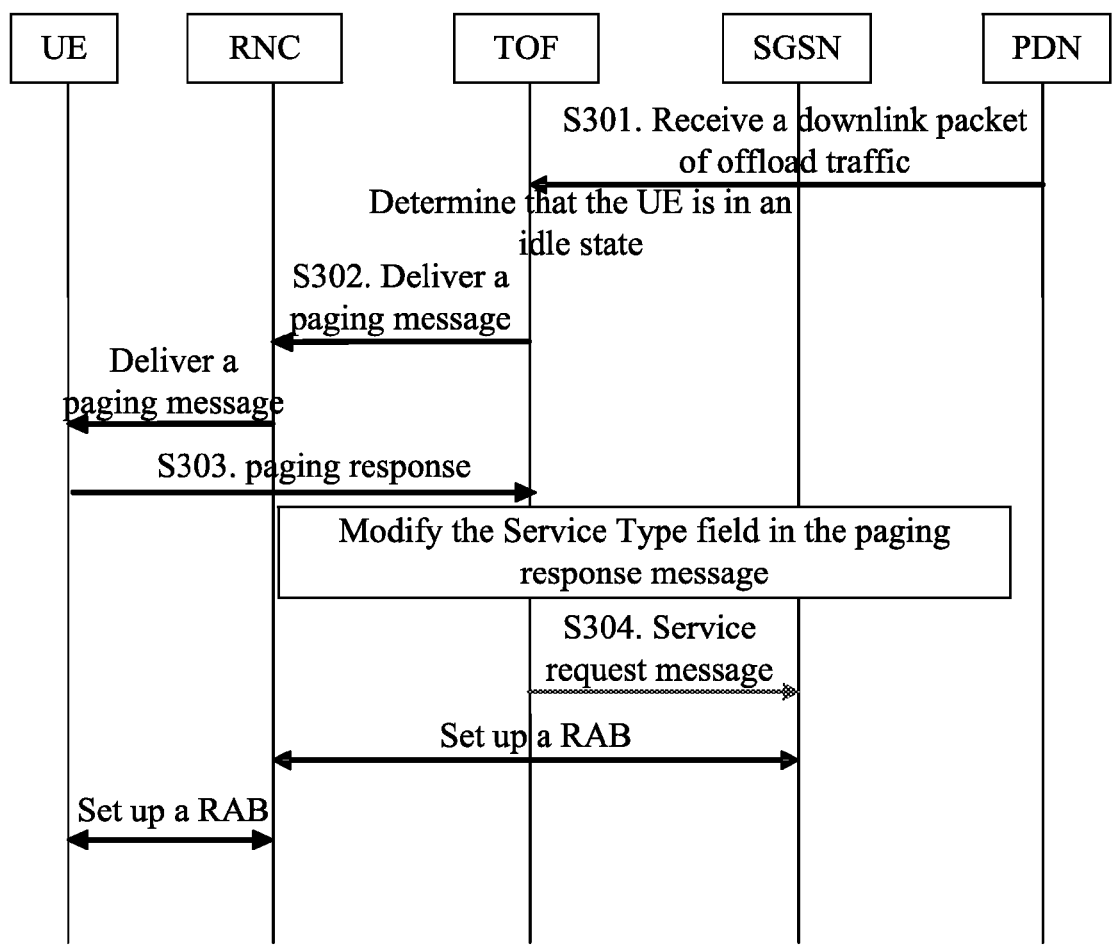
FIG. 3 is a flowchart of a second embodiment of the present invention

As shown in FIG. 3, a method for maintaining traffic continuity between a CN and a UE by paging UE by a TOF under a UMTS network architecture is provided in a second embodiment of the present invention. Apparently, those skilled in the art may understand that the embodiment is also applicable to an information exchange procedure between entities of identical functions in a Long Term Evolution (LTE) network. For example, the SGSN is corresponding to a Mobility Management Entity (MME) in the LTE network and a TOF entity may be located between an evolved NodeB (eNB) and an MME of the LTE network. The SGSN and MME each may be referred to as a CN node.

S301. A TOF entity receives a downlink packet of offload traffic of a UE, where the downlink packet of the offload traffic is sent by a PDN.

Before step S302, the embodiment further includes that the TOF entity determines that the UE is in an idle state.

A specific determining method, for example, a method that the TOF entity determines that the UE is in the idle state can be implemented through the following method: the TOF entity determines that Iu connection for the UE is released, for example, determines that the Iu connection of the UE is released by obtaining a message in an Iu connection release procedure of the TOF entity, where the Iu connection refers to signaling exchange between the CN and the access network.

S302. The TOF entity sends a CN paging message to the UE.

Further, if the TOF entity obtains no paging parameter before the TOF entity sends the CN paging message to the UE, the TOF entity may request the SGSN to deliver a paging parameter before the paging message is sent to network. Specifically, the TOF entity may request the SGSN to send the paging parameter by sending a UE context request message to the SGSN; or the TOF entity may send a dedicated paging parameter request message to request the SGSN to deliver the paging parameter to the TOF entity. The paging parameter is a parameter used to page the UE, including a parameter that indicate UE paging time, such as core network discontinuous reception (CN DRX), a parameter that indicate a UE paging area, such as Paging Area ID and Closed Subscriber Group (CSG) List, and a parameter that indicate an identity of the UE that needs to be paged, such as a Temporary Mobile Subscriber Identity (TMSI).

Figure 5:
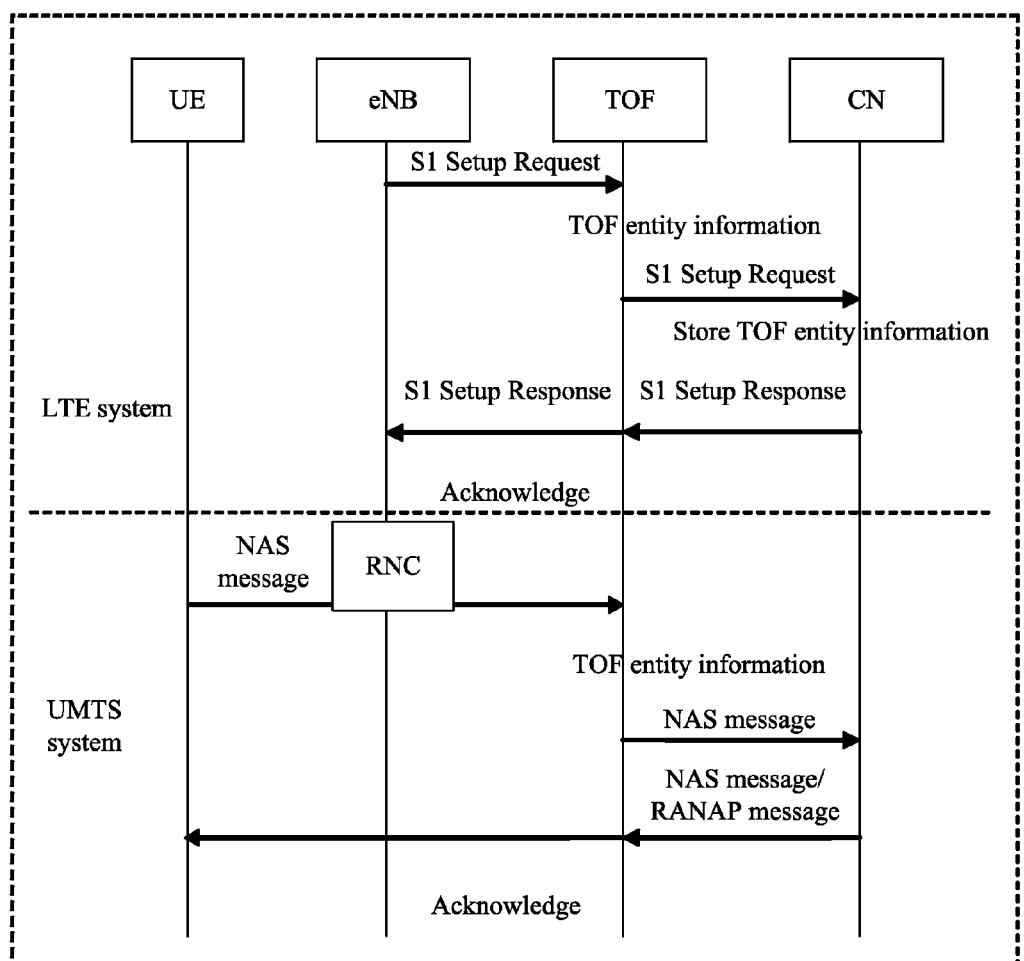
FIG. 5 is a flowchart of a TOF entity reporting TOF information in the second embodiment of the present invention.

Alternatively, the TOF may not need to request the SGSN to deliver the paging parameter. If the TOF entity has reported TOF entity information to the SGSN before the TOF entity sends the CN paging message to the UE, the SGSN may deliver the paging parameter to the TOF entity, where the TOF entity information is information that indicates traffic offload capability of the TOF entity, traffic offload address of the TOF entity, traffic offload equipment identity (TOF ID) information, security capability of the TOF entity, and other TOF entity indication information that can be determined by those skilled in the art according to the above information. Specifically, in the embodiment, the TOF entity information that can be reported by the TOF entity to the CN includes but is not limited to one or more of the traffic offload capability of the TOF entity, the traffic offload equipment identity of the TOF entity (TOF ID), the address of the TOF entity, and the security capability of the TOF entity. As shown in FIG. 5, for example, the TOF entity in an LTE system may report the TOF entity information when S1 sets up a request, or may report the TOF entity information to CN through other S1 Application Protocol messages, such as, Initial UE Message. Similarly, the TOF entity in a UMTS network may report the TOF entity information in a service request message or may report the TOF entity information through a dedicated Radio Access Network Application Part (RANAP) message. Optionally, the TOF entity information in the embodiment may be used as a universal trigger condition for the SGSN to send a new parameter or a new function to the TOF entity. That is, the SGSN may deliver the new parameter and the new function after the TOF entity information is received, where the new parameter and the new function refer to a newly added parameter and a newly added function with respect to existing parameters and functions of the TOF entity.

In addition, universal trigger conditions for the SGSN to deliver the new parameter or the new function include any one or any combination of the following conditions:

trigger condition 1: the SGSN receives the service request message sent by the UE;

trigger condition 2: information that supports and enables a traffic offload function of the TOF entity is configured locally on the CN; and trigger condition 3: the SGSN has received an indicator of supporting or enabling the traffic offload function of the TOF entity, where the indicator is sent by the TOF entity or other devices.

Further, after the TOF entity receives the paging parameter, the TOF entity forwards the paging parameter to the access network, so that the access network can page the UE. For example, after the TOF entity obtains the CN DRX, the CN DRX serving as a parameter of the paging message is delivered to the access network. The access network may calculate the paging occasion according to the CN DRX and the International Mobile Subscriber Identity (IMSI) and deliver a paging message to the UE. For example, after the TOF entity obtains the Paging Area ID, the Paging Area ID serving as a parameter of the paging message is delivered to an access network side. The access network judges whether the area served by a local node belongs to the scope of the paging area and if the area served by the local node belongs to the scope of the paging area, the paging message is delivered; otherwise, no paging message is delivered. For example, after the TOF entity obtains the CSG List, the CSG List serving as a parameter of the paging message is delivered to the access network side. The access network judges whether the CSG cell served by the local node is within the CSG List and if the CSG cell served by the local node is within the CSG List, the paging message is delivered; otherwise, no paging message is delivered. For example, after the TOF entity obtains the TMSI, the TMSI serving as a parameter of the paging message is delivered to the access network side. The access network constructs a paging message by using a temporary identity and sends the paging message to the UE. The specific method of processing the paging parameter by the access network is the prior art and will not be further described here.

S303. The TOF entity receives a paging response sent by the UE to the CN. The paging response includes a service request message of the UE, and the service request message includes a Service Type field indicative of the paging response.

Specifically, the UE receives the CN paging message sent by the TOF entity through the access network and may send a paging response to the CN. The paging response passes through the TOF entity and the TOF entity obtains the paging response, as shown in FIG. 3.

S304. The TOF entity forwards the service request message to the CN so that the CN sets up a RAB after the service request message is received. The Service Type field in the service request message indicates data content (Data).

The specific procedure that the TOF entity sends the CN paging message to the UE in step S302 and the specific procedure that the TOF receives the paging response in step S303 correspond to specific function of a paging initiating module of the TOF entity in an apparatus embodiment of the present invention. Step S304 in which the TOF entity forwards the service request message to the CN corresponds to a service request message forwarding module of the TOF entity. Further, corresponding to a paging parameter sending function, the TOF entity further includes a paging parameter requesting module that corresponds to the specific procedure that the TOF entity requests the SGSN to send a paging parameter in the embodiment.

The second embodiment of the present invention takes the UMTS system as an example to describe a method for restoring communication between a CN and a UE through a TOF entity and points out the method that extends to the LTE system and other systems. Further, the second embodiment of the present invention provides a method for the TOF entity to obtain the paging parameter, and the issue in the prior art that the TOF entity fails to send the paging message in the proper time is solved, where the issue is caused when the SGSN initiates to page a UE in an idle state and the paging parameter stored by the TOF entity is not updated in time or the paging parameter is not obtained. For example, the failure to use a proper DRX parameter for the paging will cause a large amount of waste of the signaling overhead. For the case that the TOF fails to obtain the paging area or the CSG List, the paging optimization cannot be performed, and unrelated entities such as the RNC and HNB will initiate unnecessary paging to cause the waste of resources.

Figure 4:
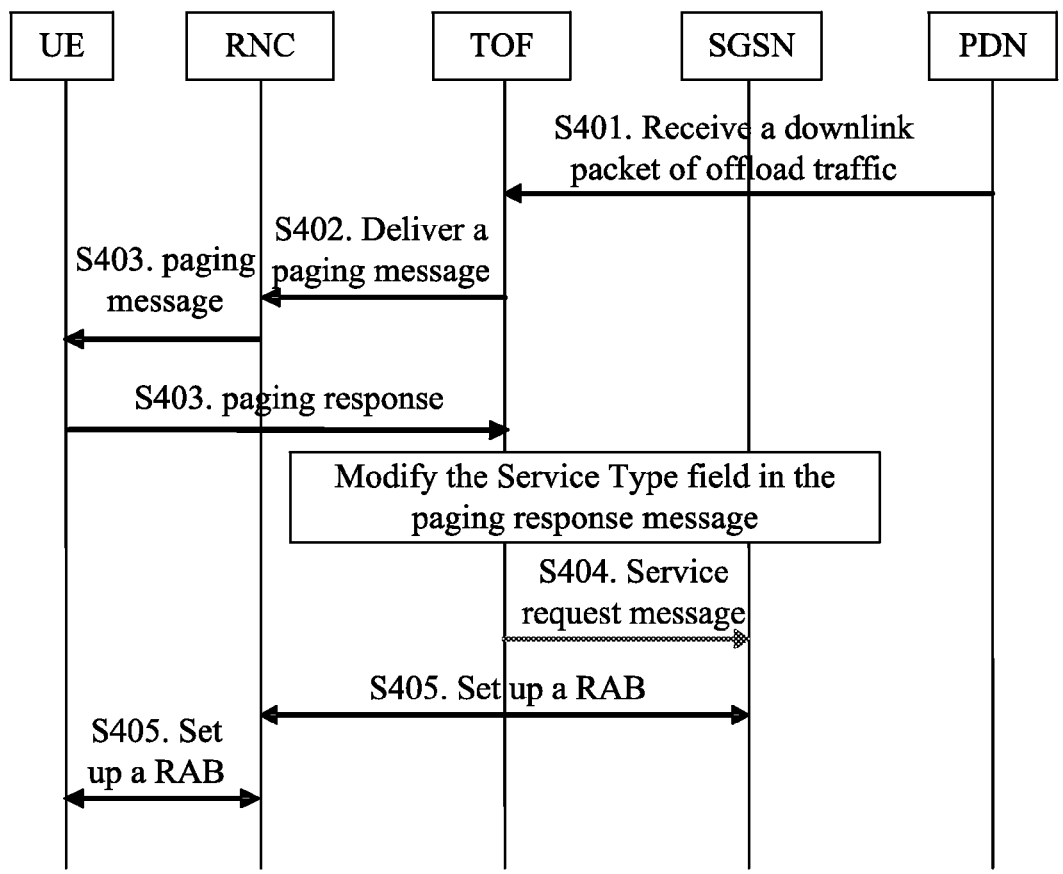
FIG. 4 is a flowchart of a third embodiment of the present invention.

A third embodiment of the present invention provides an example of a information exchange procedure between a TOF entity and a UE, or a CN, as shown in FIG. 4.

S401. The TOF entity receives a downlink packet of offload traffic of a UE.

Further, the step may include that the TOF entity determines that the UE receiving the downlink packet of the offload traffic is in an idle state, and the specific judging method is the same as step S302.

S402. The TOF entity sends a CN paging message to the UE.

Further, if the TOF entity does not store one or more parameters of CN DRX, Paging Area ID, and CSG List of the UE, the TOF entity may request the SGSN to deliver paging parameters which include one or more parameters of CN DRX, Paging Area ID, and CSG List. The specific requesting method is the same as that in step S302 and will not be further described here.

S403. The UE receives the CN paging message sent by the TOF entity and sends a paging response to the CN, where the paging response is a service request message of the UE.

Specifically, the UE receives the CN paging message sent by the TOF entity, where the CN paging message includes the CN paging message that is sent by the TOF entity and is forwarded by the RNC. The request message sent by the UE includes Packet-Temporary Mobile Subscriber Identity (P-TMSI), Routing Area Identity (RAI), Cipher Key Sequence Number (CKSN), and Service Type, where the Service Type field indicates a paging response.

S404. The TOF entity obtains the service request message and forwards, to the CN, the service request message that includes a Service Type field that indicates Data.

Specifically, the TOF entity may modify, through information setting, the paging response indicated by the Service Type field to Data indicated by the Service Type field.

S405. The CN receives the service request message and initiates a RAB setup procedure to restore communication with the UE.

Specifically, the CN determines that the Service Type field in the service request message indicates Data and determines that the communication with the UE is needed to set up.

Optionally, after the above steps of the embodiment are complete, the procedure may further include step S406 in which the TOF entity obtains subscriber information required by the traffic offload matching policy and executes the traffic offload policy matching; and if the matching is successful, traffic offload is enabled and a Network Address Translation (NAT) table entry is created to restore the uplink and downlink transmission of the offload traffic. The specific offload procedure is the procedure that the TOF entity executes the offload traffic in the prior art and will not be described here.

The specific procedure that the TOF entity sends the CN paging message to the UE in step S402 and the specific procedure that the paging response is received in step S403 correspond to the function of a paging initiating module of the TOF entity in an apparatus embodiment. Step S404 in which the TOF entity forwards the service request message to the CN corresponds to a service request message forwarding module of the TOF entity. Further, corresponding to the paging parameter sending function, the TOF entity further includes a paging parameter requesting module that corresponds to the specific procedure that the TOF entity requests the SGSN to send a paging parameter in the embodiment.

In the third embodiment of the present invention, the information exchange procedure between the TOF entity and the UE or between the TOF entity and the CN is taken as an example for describing the method of restoring the communication between the CN and the UE through the TOF entity. Further, the third embodiment further provides a method that the TOF entity obtain the paging parameter, and the issue in the prior art that the TOF entity fails to send the paging message in the proper time is solved, where the issue is caused when the SGSN initiates to page a UE that is in an idle state and the paging parameter stored by the TOF entity is not updated in time or the paging parameter is not obtained.

Figure 6:
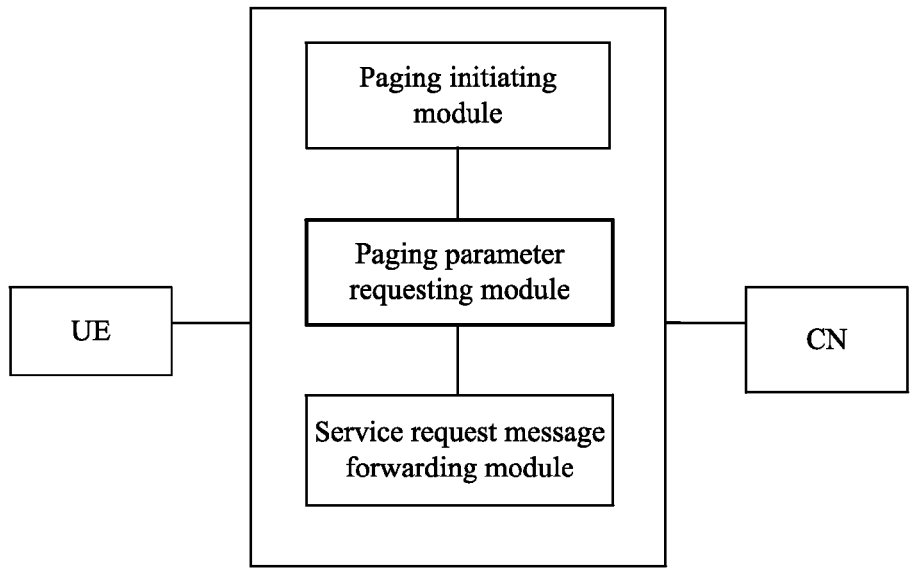
FIG. 6 is a structural diagram of a TOF entity in a fourth embodiment of the present invention.

A fourth embodiment of the present invention provides a TOF entity, as shown in FIG. 6, including: a paging initiating module, configured to send a CN paging message to a UE and receive a paging response sent by the UE to a CN; a service request message forwarding module, configured to forward a service request message in the paging response to the CN for setup of a communication connection between the CN and the UE to ensure traffic continuity, where a Service Type field in the service request message indicates a data content (Data). Further, the TOF entity may further include a paging parameter requesting module. For specific method procedures, reference may be made to corresponding description of the method embodiments.

Through the TOF entity provided in the fourth embodiment, a communication connection can be established between the CN and the UE by paging the UE, so as to complete the transmission of service data and maintain the traffic continuity.

In addition, in the existing network, dedicated bearers are used to transmit Internet Protocol (IP) data flows and certain IP data needs to be transmitted at a specific rate. Correspondingly, as for different service transmission requirements, the dedicated bearers can be distinguished as Guaranteed Bit Rate (GBR) bearers and non-GBR bearers. GBR bearers have guaranteed bandwidths, that is, guaranteed bit rates, to transmit data, while non-GBR bearers need to share an Aggregate Maximum Bit Rate (AMBR). A non-GBR service can tolerate loss of packets in the case of network congestion while a GBR service is not subject to such loss of packets. For example, the current Internet traffic generally belongs to non-GBR traffic which is transmitted through non-GBR bearers. The subscription information of the UE defines the Access Point Name-Aggregate Maximum Bit Rate (APN-AMBR) of each PDN for the non-GBR service of the PDN and also defines the UE-AMRB for air interface non-GBR rate control. A non-GBR bearer is mainly used to bear a data service. To improve the bandwidth utilization efficiency of a system as much as possible, the Evolved Packet System (EPS) adopts the concept of aggregation and defines the AMBR parameter. AMRB is a QoS parameter of an Internet Protocol Connectivity Access Network (IP-CAN) session connected to a PDN. Multiple EPS bearers connected with the same PDN can share the same AMRB value. When other EPS bearers transmit no traffic, each of the non-GBR bearers can potentially utilize the entire AMBR. Therefore, an AMBR parameter actually limits the total rate that can be provided by all bearers that share the AMBR.

The AMBR parameter can be categorized into UE-AMBR and APN-AMBR on the basis of two different scenarios. UE-AMBR serving as subscriber data of a UE is stored in a Home Subscriber Server (HSS), and is used for indicating the parameter attribute of the UE with respect to different PDN access and is transferred to an MME by the HSS through a network registration procedure. When the UE creates a first data connection to a certain PDN, the corresponding uplink and downlink UE-AMBR can be transferred to an eNodeB entity through a default bearer setup procedure and the eNodeB will complete control and execution corresponding to the UE-AMBR. An APN-AMBR parameter is a subscriber parameter stored in an HSS with respect to an APN, and actually limits an aggregate bit rate that is expected to be provided by all PDN connections in the same APN. The downlink APN-AMBR is executed by a PDN-GW and the uplink APN-AMBR is executed by the UE or the PDN-GW.

UE-AMBR serving as the subscriber data of the UE is stored in an HSS, and is used for indicating the parameter attribute of the UE with respect to different PDN access and is delivered to an MME by the HSS through a network registration procedure. When the UE creates a first data connection to a certain PDN, the corresponding uplink and downlink UE-AMBR can be transferred to an eNodeB through a default bearer setup procedure, and the eNodeB will complete control and execution corresponding to the UE-AMBR. The APN-AMBR parameter is a subscriber parameter stored in an HSS with respect to each APN, and actually limits the aggregate bit rate that is expected to be provided by all PDN connections in the same APN. The downlink APN-AMBR is executed by a PDN-GW and the uplink APN-AMBR is executed by the UE or the PDN-GW.

A UMTS network is taken as an example. After each PDN connection is activated, a GGSN or Packet Gateway (PGW) sends, to the SGSN, the in-use APN-AMBR of the PDN connection that is allowed for transmission. A sum of in-use APN-AMBRs of all activated PDN connections cannot exceed a subscribed UE-AMBR. The SGSN regards a smaller value between the sum of APN-AMBRs and the subscribed UE-AMBR as the in-use UE-AMBR and sends it to the access network for rate control. Definitely, if the network is an LTE network, an MME can implement the function of calculating the APN-AMBR by the SGSN.

After the traffic offload of the TOF entity is enabled, because the traffic offloaded by the TOF does not need to pass through a CN entity, for example, is transmitted without passing through the SGSN or GGSN, CN entities, such as the SGSN and GGSN, cannot acquire the traffic that is on a single PDN connection and is offloaded at the RAN side by the TOF directly to the PDN. In the case of a subscriber with multiple PDN connections, the CN entity, such as the SGSN, cannot acquire that the traffic of a single PDN is offloaded either.

Because the UE-AMBR calculated by a CN entity, such as the SGSN, cannot match all traffic that needs to be transmitted, the UE-AMBR sent by the CN entity, such as the SGSN, to the RAN side cannot match all traffic that needs to be transmitted either. Therefore, the air interface rate control at the RAN side is not proper. For example, loss of packets may occur, which influences the user experience.

In view of the above technical issues, each embodiment of the present invention provides a method of calculating UE-AMBR, so as to enable the RAN side to obtain a UE-AMBR that matches all traffic that needs to be transmitted, thereby carrying out rational air interface rate control and enhancing the user experience.

A fifth embodiment takes the UMTS network as an example to describe a case that services on the GGSN and TOF entity share the subscribed APN-AMBR.

Because the SGSN can obtain the APN-AMBR of the GGSN, for example, the SGSN can obtain the APN-AMBR by requesting the HSS for the subscribed APN-AMBR, the SGSN can use the subscribed APN-AMBR shared by the GGSN and TOF to calculate a UE-AMBR that meets the transmission requirement and controls the air interface rate at the RAN side.

Figure 7:
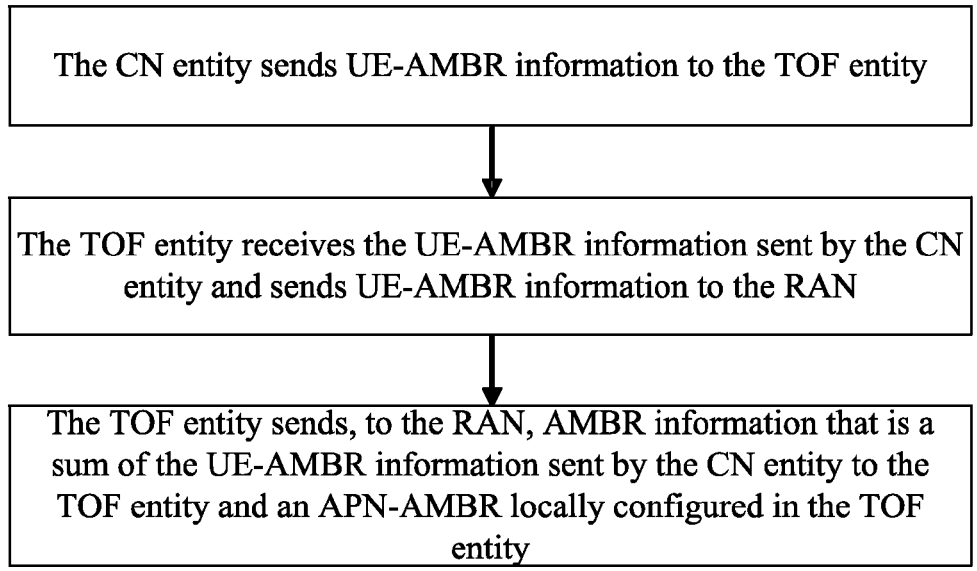
FIG. 7 is a flowchart of a fifth embodiment of the present invention.

As shown in FIG. 7, the specific procedure is that, the CN entity sends the UE-AMBR information, which is also referred to as the UE-AMBR parameter, to the TOF entity, for example, sends the information through a RAB Assignment Request. The UE-AMBR is the smaller value between the sum of APN-AMBRs and the subscribed UE-AMBR. The subscribed UE-AMBR is the difference between a current subscribed UE-AMBR and an APN-AMBR that is locally configured in the TOF.

After the TOF entity receives the UE-AMBR information sent by the CN entity, the TOF entity sends UE-AMBR information, which is also referred to as a UE-AMBR parameter, to the RAN. The AMBR information, which is also referred to as AMBR parameter, sent by the TOF entity to the RAN is a sum of the UE-AMBR information sent by the CN entity to the TOF entity and the APN-AMBR locally configured in the TOF entity.

More specific examples are provided in the embodiment. For example, the embodiment can be implemented in the following two methods.

In a first method, a specific procedure implementation is provided under a condition that the existing CN architecture is not changed. An APN-AMBR is locally configured in the TOF entity and an operator reduces a subscribed UE-AMBR=a current subscribed UE-AMBR−the APN-AMBR locally configured in the TOF. The SGSN calculates a sum of APN-AMBRs returned by all GGSNs, compares the sum with the subscribed UE-AMBR, and delivers a smaller value to the RAN. After the TOF entity receives the UE-AMBR delivered by the SGSN, the UE-AMBR=the received UE-AMBR+the APN-AMBR locally configured in TOF is calculated. The TOF sends the modified UE-AMBR to the RAN side to implement the air interface rate control in the RAN. The TOR entity may send, through a RAB Assignment message or a QoS Modification message, the UE-AMBR modified by the TOF. Definitely, if the subscribed UE-AMBR is large enough, for example, the sum of APN-AMBRs configured in all GGSNs and APN-AMBRs of the TOF may not be exceeded the subscribed UE-AMBR according to the experience value of the operator, the subscribed UE-AMBR is not necessarily modified.

Or, the subscribed APN-AMBR that is used for traffic offload and is in the subscriber information=the current subscribed APN-AMBR−the APN-AMBR locally configured in the TOF. The SGSN calculates the sum of APN-AMBRs returned by all GGSNs, compares the sum with the subscribed UE-AMBR, selects the smaller value as the UE-AMBR, and sends the value to the TOF entity. After the TOF entity receives the UE-AMBR delivered by the SGSN, the UE-AMBR=the received UE-AMBR+the APN-AMBR locally configured in the TOF is calculated. The TOF sends the UE-AMBR modified by the TOF entity to the RAN side, and the UE-AMBR serves as a UE-AMBR with which the air interface rate control is performed at the RAN side.

Or, the subscribed UE-AMBR modification method and the subscribed dedicated APN-AMBR modification method can be combined for use. That is, the operator modifies the subscribed UE-AMBR and the subscribed dedicated APN-AMBR simultaneously. The subscribed UE-AMBR=the current subscribed UE-AMBR−the APN-AMBR locally configured in the TOF and the subscribed APN-AMBR used for traffic offload=the current subscribed APN-AMBR−the APN-AMBR locally configured in the TOF are modified simultaneously.

In the first method of the embodiment, the steps in which the TOF entity obtains the AMBR information, calculates AMBR information, and sends the calculated AMBR information to the RAN respectively correspond to an AMBR obtaining module, an AMBR calculating module, and an AMBR sending module in the apparatus embodiment.

The first method provides a method of providing a more rational UE-AMBR for the RAN to perform air interface rate control without changing the CN structure.

In a second method, the CN structure is changed, so that the RAN can use a UE-AMBR that meets the service transmission requirement to perform air interface rate control.

The specific procedure is that the SGSN receives the APN-AMBR information sent by the GGSN. The APN-AMBR information is equal to the difference between the APN-AMBR configured in the GGSN and the APN-AMBR offset configured for the offload traffic of the TOF entity. The SGSN calculates a UE-AMBR according to the received APN-AMBR information, and the following steps are particularly included: the SGSN compares the sum of APN-AMBRs and the subscribed UE-AMBR, selects a smaller value, and sends the value to the TOF entity. The TOF entity receives the UE-AMBR information sent by the SGSN, and the APN-AMBR of the TOF is configured as the APN-AMBR offset that is used for the offload traffic of the TOF and is configured at the GGSN side.

The procedure can be further decomposed as follows:

The APN-AMBR offset used for the offload traffic of the TOF is configured in the GGSN. Specifically, the configuring method is that the APN-AMBR is calculated by the GGSN according to the existing algorithm or configuration is implemented through network management configuration.

After the subscribed APN-AMBR sent by the SGSN is received by the GGSN, the GGSN configures the local APN-AMBR and returns the APN-AMBR to the SGSN for UE-AMBE calculation, and the SGSN calculates the UE-AMBR. The specific calculation method is the same as that in the first method, and is not detailed again. The SGSN sends the calculated UE-AMBR to the TOF entity. In practical use, a bit rate used by the GGSN for service transmission is equal to the APN-AMBR locally configured in the GGSN minus the APN-AMBR offset configured in the TOF entity.

After the UE-AMBR is received by the TOF entity, the TOF entity locally configures the APN-AMBE, which is used for the offload traffic, as the APN-AMBR offset configured in the GGSN for the TOF.

The TOF entity forwards, to the RAN, the UE-AMBR that is calculated and delivered by the SGSN, for example, sends the UE-AMBR through a RAB Assignment or QoS Modification message.

In the second method of the embodiment, the steps in which the TOF entity obtains the AMBR information, calculates the AMBR information, and sends the calculated AMBR information to the RAN respectively correspond to an AMBR obtaining module, an AMBR calculating module, and an AMBR sending module in the apparatus embodiment.

In addition, the above methods are also applicable in a case where the operator defines a dedicated APN-AMBR for the offload traffic.

In the first method, the reduced UE-AMBT in the subscriber information=the current subscribed UE-AMBR−the APN-AMBR locally configured in the TOF is also applicable to a case in which a dedicated APN-AMBR is defined for the offload traffic. In addition, in a case where a dedicated APN-AMBR is defined, the subscribed dedicated APN-AMBR can be set to 0, that is, for the offload traffic, the subscribed dedicated APN-AMBR is set to 0 and the GGSN is not used for transmission. For a defined dedicated bearer, the subscribed UE-AMBR modification method and the subscribed dedicated APN-AMBR modification method can be combined for use. That is, the operator modifies the subscribed UE-AMBR and the subscribed dedicated APN-AMBR simultaneously.

According to the second method, in a case in which a dedicated bearer is defined, the GGSN still locally configures an APN-AMBR as the APN-AMBR offset locally configured in the TOF, and sends the APN-AMBR to the SGSN, but the APN-AMBR actually used by the GGSN is 0.

A sixth embodiment describes in detail a procedure for calculating and sending a UE-AMBR parameter shared by the GGSN and the TOF.

A first method that implements the sixth embodiment is as follows:

Parameters used in the procedure include the subscribed UE-AMBR. The parameters used in the procedure include the subscribed APN-AMBR shared by the TOF and GGSN, that is, a bearer that is transmitted together by the GGSN and the TOF. That is, the GGSN and TOF share a PDN connection and a bearer except that the physical paths are different. The APN-AMBR is applicable to both the GGSN and the TOF. The parameters used in the procedure also include the GGSN configured APN-AMBR, and the specific configuring method can be implemented according to the existing algorithm. The remaining subscribed APN1-AMBR of the GGSN=the subscribed APN-AMBR−the APN-AMBR configured in the GGSN, that is, the remaining subscribed APN-AMBR of the GGSN is the difference between the APN-AMBR allocated for the GGSN in the subscriber information and the APN-AMBR configured in the GGSN. The APN-AMBR allocated for the GGSN is the subscribed APN-AMBR shared by the GGSN and the TOF. The parameters used in the procedure also include the sum of the APN-AMBRs configured in the GGSN for the non-offload traffic, and the sum of the APN-AMBRs configured in the GGSN for the non-offload traffic includes the sum of APN-AMBRs configured in all GGSNs or includes the sum of the APN-AMBRs configured in all GGSNs minus the APN-AMBR shared by the TOF and the GGSN (including the shared APN-AMBR and not including the APN1-AMBR configured in the GGSN). The parameters used in the procedure also include the APN-AMBRs configured in the TOF entity for the offload traffic.

With the above parameters, the specific steps of sending the UE-AMBR for air interface rate control to the RAN are as follows:

Step 611: The SGSN sends a RAB Assignment message to the RAN, where the RAB Assignment message includes the following parameters: the sum of APN-AMBRs configured in the GGSN for the non-offload traffic, remaining subscribed APN-AMBRs, and subscribed UE-AMBRs.

Step 612: The RAB Assignment message passes through the TOF entity, and after the TOF entity receives the RAB Assignment message, the TOF entity configures the APN-AMBR for local offload traffic according to the parameters in the RAB Assignment message: the remaining subscribed APN-AMBR, that is, the remaining subscribed APN-AMBR of the GGSN=the subscribed APN-AMBR−APN-AMBR configured in the GGSN. Specifically, the TOF entity calculates the UE-AMBR according to the following formula: UE-AMBR=the sum of APN-AMBRs configured in the GGSN for other non-offload traffic (including APN-AMBRs configured in the GGSN)+APN-AMBRs configured in the TOF for the offload traffic. The TOF entity sends the UE-AMBR=the min (the above calculated UE-AMBR, subscribed UE-AMBR) to the RAN side. Further, the TOF may delete the parameters added in step 611. Optionally, if the UE-AMBR calculated by the TOF entity and the UE-AMBR that is received by the TOF entity and is sent from the SGSN are different, the TOF may report the calculated UE-AMBR to the CN. Specifically, the calculated UE-AMBR may be reported to the CN through a message in the existing QoS modification procedure or by defining a dedicated message.

A second method that implements the sixth embodiment is as follows:

The procedure includes the following steps:

Step 621: The SGSN sends a RAB Assignment message to the RAN, where the RAB Assignment message includes: the sum of APN-AMBRs configured in the GGSN for the non-offload traffic (not including APN-AMBR that is configured in the GGSN and shared by the GGSN and TOF)+subscribed APN-AMBRs, remaining subscribed APN1-AMBRs, and subscribed UE-AMBRs.

Step 622: After the RAB Assignment message is received by the TOF entity, the TOF configures the APN1-AMBR for the local offload traffic and calculates a UE-AMBR=(the sum of APN-AMBRs configured in the GGSN for the non-offload traffic (not including the APN-AMBR that is configured by the GGSN and is shared by the GGSN and TOF entity)+the subscribed APN1-AMBR)−(the remaining subscribed APN-AMBR−APN-AMBRs configured in the TOF for the offload traffic). The TOF entity sends the UE-AMBR=the min (the above calculated UE-AMBR, the subscribed UE-AMBR) to the RAN. Further, the TOF may delete the parameters added in step 621 and then send the UE-AMBR to the RAN for air interface rate control. Optionally, if UE-AMBR calculated by the TOF is different from the UE-AMBR received by the TOF entity, the TOF may report the calculated UE-AMBR to the CN. The calculated UE-AMBR may be reported to the CN through a message in the existing QoS modification procedure or by defining a dedicated message.

Further, in a scenario where a dedicated APN-AMBR is defined for the offload traffic:

In the first method of the sixth embodiment, the APN-AMBR sent by the SGSN to the GGSN may be set to 0. In this case, the GGSN also configures the APN1-AMBR to 0 for the APN. The subscribed APN-AMBR in step 611 is the same as the remaining subscribed APN-AMBR.

In the second method of the sixth embodiment, the parameters added in step 621 include: the sum of APN-AMBRs configured in the GGSN for the non-offload traffic, the subscribed APN-AMBR, and the subscribed UE-AMBR, where the sum of APN-AMBRs does not include the value of the dedicated APN-AMBR configured in the GGSN. In step 622, alternatively, the SGSN does not count the APN-AMBR returned by the GGSN when calculating the UE-AMBR. The calculated UE-AMBR=the sum of APN-AMBRs configured in the GGSN for the non-offload traffic (not including the APN1-AMBR configured in the GGSN)+the APN-AMBR configured in the TOF for the offload traffic.

In the sixth embodiment, the steps in which the TOF entity obtains AMBR information, calculates AMBR information, and sends the calculated AMBR information to the RAN respectively correspond to an AMBR obtaining module, an AMBR calculating module, and an AMBR sending module in the apparatus embodiment.

A seventh embodiment provides another solution in which the GGSN and the TOF entity share the subscribed APN-AMBR, so that the RAN may obtain a UE-AMBR that matches the transmitted traffic to perform air interface rate control.

The SGSN divides the subscribed APN-AMBR into two parts or the subscribed APN-AMBR in the subscriber information includes two separated parts. The SGSN negotiates the APN-AMBR with the GGSN and the TOF separately and calculates the UE-AMBR according to negation results. The specific calculating method is the same as that described above, and is not described in detail again. The SGSN delivers the calculated UE-AMBR to the RAN.

Specifically, after the configuration of an APN-AMBR in the GGSN is completed, the SGSN obtains the remaining APN-AMBR of the GGSN according to the APN-AMBR that is configured in the GGSN and is returned by the GGSN to the SGSN. The SGSN negotiates with the TOF entity by using the remaining subscribed APN-AMBR, and the specific steps are included as follows:

Step 71: When the UE initiates a traffic offload request, the SGSN negotiates the QoS parameter APN-AMBR with the GGSN. The SGSN sends the subscribed APN-AMBR to the GGSN, and the GGSN configures the local APN-AMBR and returns the APN-AMBR configured in the GGSN to the SGSN.

Step 72: The SGSN uses the difference, which is obtained through the subscribed APN-AMBR minus the APN-AMBR configured in the GGSN, to negotiate the value of the APN-AMBR for the offload traffic of the TOF entity with the TOF entity. The SGSN sends the difference (the subscribed APN-AMBR minus the APN-AMBR configured in the GGSN) to the TOF entity, and the TOF configures a local APN-AMBR and returns the value of the APN-AMBR configured in the TOF entity to the SGSN. Optionally, during the negotiation between the TOF entity and the SGSN, an APN-AMBR parameter modification procedure between the SGSN and the GGSN is triggered.

Step 73: The SGSN calculates the UE-AMBR=SUM (all APN-AMBRs configured in the GGSN, the AMBR configured in the TOF), and compares the calculated UE-AMBR with the subscribed UE-AMBR. The SGSN sends the min (calculated UE-AMBR, subscribed UE-AMBR) to the RNC.

Steps 72 and 73 may be executed in the procedure in which the SGSN initiates the RAB setup or may be performed in a QoS modification procedure, or may be performed through a defined dedicated interaction message between the TOF and the SGSN.

In the above steps, the trigger condition for the TOF entity and the SGSN to initiate AMBR negotiation may include any one or any combination of the following trigger conditions:

Trigger condition 1: when the TOF entity enables traffic offload, the TOF entity notifies the SGSN that a traffic offload function is enabled for a certain PDN bearer or the traffic on the RAB or notifies the SGSN that the offload function can be applied to the PDN bearer or the RAB. The specific notification method includes: the TOF sends, to the SGSN, a traffic offload indication message or a QoS modification request message, where the message optionally carries a bearer ID for the traffic offload.

The trigger condition 1 is used to trigger the SGSN to initiate a QoS modification procedure with the GGSN and the TOF entity. QoS parameters may include one or both of APN-AMBR and UE-AMBR. The SGSN may negotiate QoS with one or both of the GGSN and the TOF.

Trigger condition 2: when the SGSN receives a service request, the SGSN judges that the APN corresponding to the service can support offload, the SGSN actively initiates a QoS negotiation procedure with the TOF entity.

Trigger condition 3: after receiving a RAB Assignment message, the TOF entity determines that the borne service is offload traffic and actively initiates a QoS modification procedure to the CN. Compared with trigger condition 1, the time of the QoS negotiation is earlier.

Figure 8:
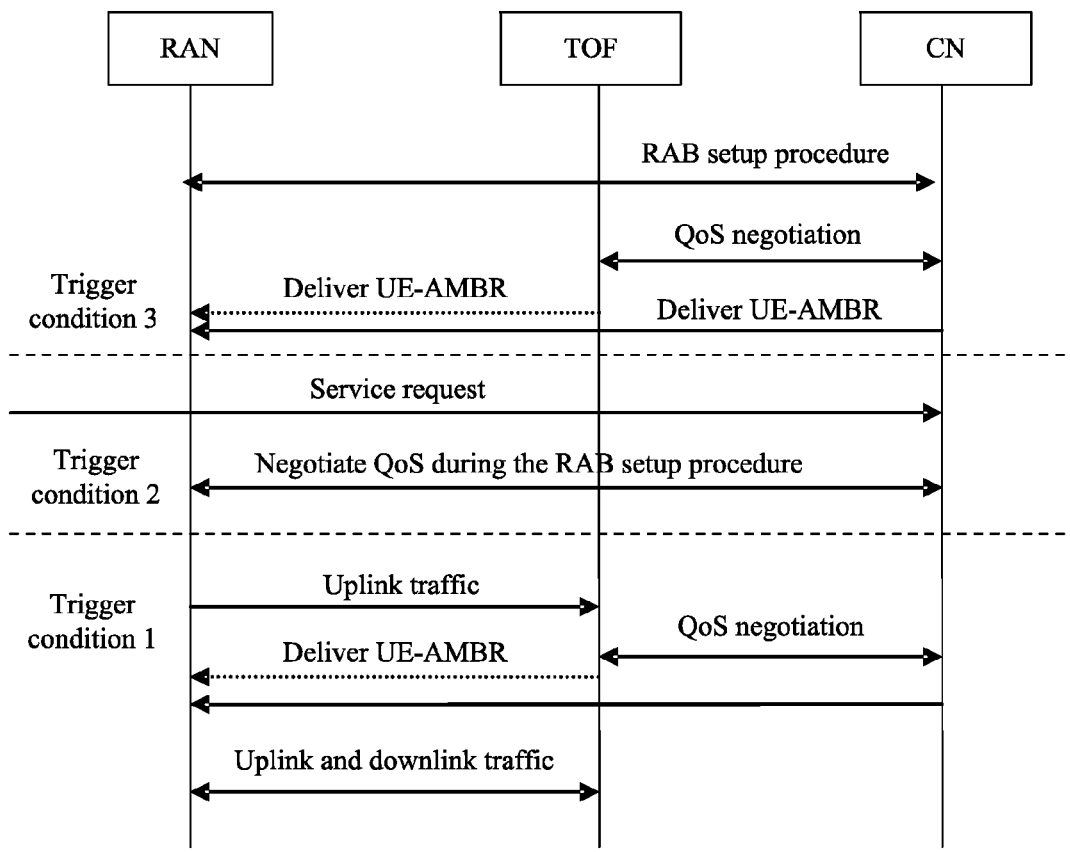
FIG. 8 is a flowchart of use of trigger conditions in a seventh embodiment of the present invention.

The QoS negotiation procedure triggered with the above trigger conditions can be implemented through the following procedure:

For example, the negotiation can be implemented through the following procedure as shown in FIG. 8:

With respect to trigger condition 1, the TOF entity receives the downlink traffic sent by the RAN, and the negotiation is initiated after the TOF parses the uplink traffic to successful match the offload policy. The TOF entity initiates QoS negotiation with the CN, and specifically a bearer QoS modification procedure initiated by the RAN is included.

Figure 10:
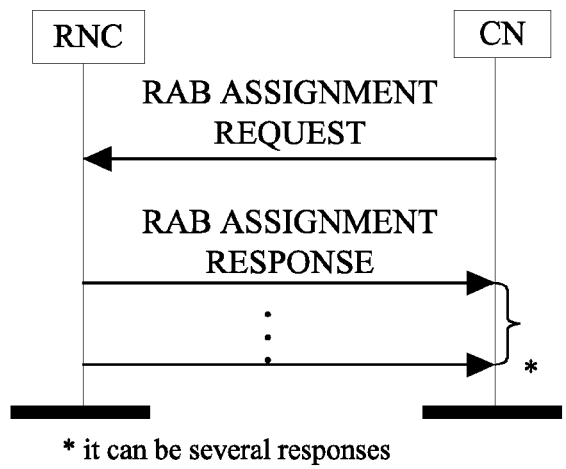
FIG. 10 is a flowchart of setup of a RAB in the seventh embodiment of the present invention.

With respect to trigger condition 2, QoS negotiation is initiated during a RAB setup procedure. The specific procedure includes the following:

As shown in FIG. 10, the RAB setup procedure includes that the CN node sends a RAB Assignment Request to the RNC at the RAN side and the RNC returns a RAB Assignment Response to the CN so as to set up a RAB. The RAB Assignment Request includes the QoS parameters sent by the CN to the RNC for QoS negotiation, such as an AMBR parameter. In addition, in a UMTS network, the procedure is also called as a RAB assignment procedure.

Figure 9:
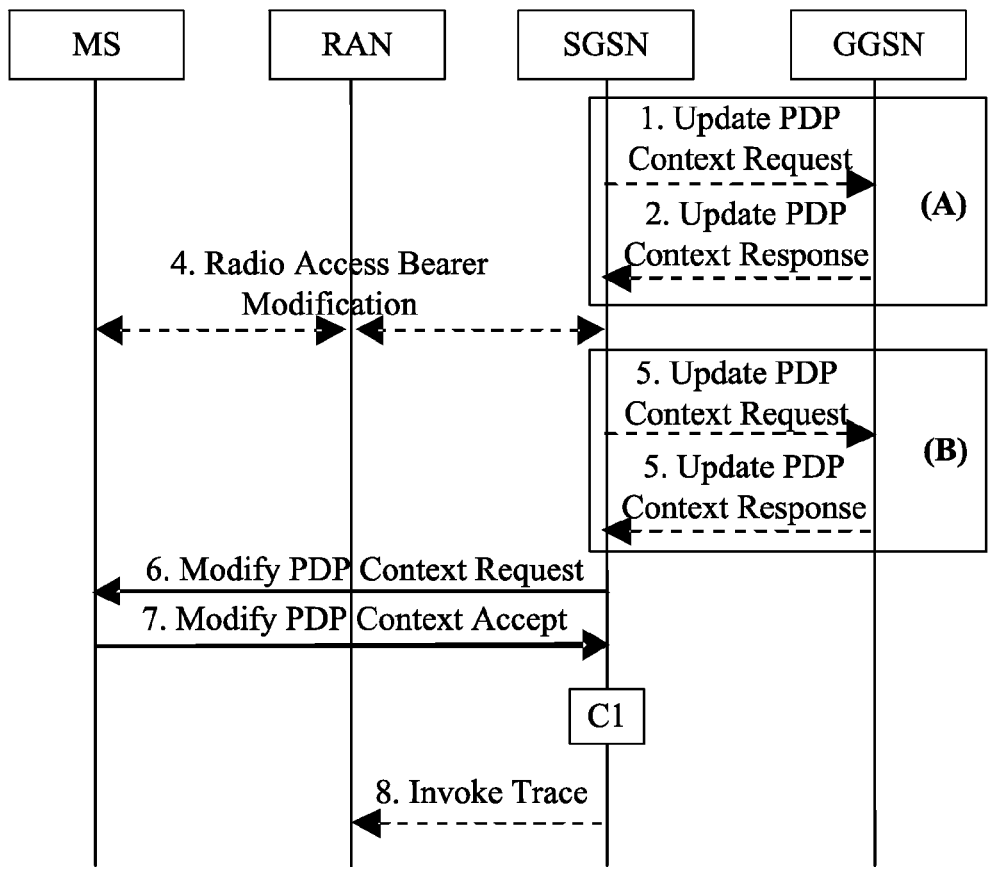
FIG. 9 is a flowchart of negotiation of a Quality of Service (QoS) in the seventh embodiment of the present invention.

With respect to trigger condition 3, as shown in FIG. 9, for example, if the QoS changes during the RAB setup procedure, the SGSN may initiate a PDP context modification procedure, which involves the QoS parameter APN-AMBR.

An Update PDP Context Request sent by the SGSN to the GGSN includes the subscribed APN-AMBR. The response returned by the GGSN includes the configured APN-AMBR. The SGSN calculates the UE-AMBR for another time according to the value returned by the GGSN and compares the calculated UE-AMBR with the subscribed UE-AMBR, and sends the smaller value to the RAN in the RAB assignment procedure.

The seventh embodiment is also applicable to a scenario in which a dedicated APN is defined for the offload traffic.

The SGSN sets the subscribed APN-AMBR, which is negotiated with the GGSN, to 0, or when the SGSN calculates the UE-AMBR, the SGSN does not count the configuration value of the APN-AMBR that is dedicated to the offload, where the configuration value is returned by the GGSN.

In addition, more specifically, in a scenario where the SGSN divides the APN-AMBR to two parts, one part is used for the offload traffic and the other part is used for the non-offload traffic, the following steps are specifically included:

Step 721: The SGSN divides the subscribed APN-AMBR into two parts according to the network configuration: the subscribed APN-AMBR=APN-AMBR of GGSN+APN-AMBR of the TOF entity. That is, the SGSN sends one part of the subscribed APN-AMBR information to the TOF, where the subscribed APN-AMBR information is the sum of the subscribed APN-AMBR of the GGSN and the subscribed APN-AMBR of the TOF entity.

Step 722: The SGSN uses the APN-AMBR of the GGSN in the subscribed APN-AMBR to negotiate with the GGSN and uses the APN-AMBR of the TOF entity in the subscribed APN-AMBR to negotiate with the TOF entity. The SGSN calculates the sum of the APN-AMBR of the GGSN and the APN-AMBR of the TOF according to negotiation results, compares the sum with the subscribed UE-AMBR, and sends the smaller value to the RAN. In the case where a dedicated APN is defined for the offload traffic, specifically, the SGSN may set the subscribed APN-AMBR of the GGSN to 0, or when the SGSN calculates the UE-AMBR, the SGSN does not count the configuration value of the APN-AMBR that is dedicated to the offload, where the configuration value is returned by the GGSN.

In the subscriber information, a certain APN-AMBR that is set by an operator includes two parts: that is, the subscribed APN-AMBR of the GGSN, which may be also indicated as APN-AMBRGGSN that is used for the non-offload traffic of the GGSN, and the subscribed APN-AMBR of the TOF entity, which may be also indicated as APN-AMBRTOF that is used for the offload traffic of the TOF entity.

According to the network configuration, after the SGSN receives the subscribed APN-AMBR that includes the above two parts, the SGSN uses the APN-ABMR of the GGSN to negotiate an APN-AMBR parameter with the GGSN and uses the APN-AMBRTOF of the TOF entity in the subscribed APN-AMBR to negotiate an APN-AMBR with the TOF entity. The SGSN calculates the sum of the APN-AMBR configured in the GGSN and the APN-AMBR configured in the TOF, compares the sum with the subscribed UE-AMBR, and after comparison, the SGSN sends the smaller value to the RNC at the RAN side for air interface rate control.

During the procedure in which the SGSN calculates the UE-AMBR that is to be sent to the RAN, if a dedicated APN is defined for the offload traffic, the SGSN sets the subscribed AMBR negotiated with the GGSN is set to 0. That is, if the dedicated APN is defined for the offload traffic, the SGSN may instruct the GGSN to set the subscribed APN-AMBR parameter for the bearer context established for the offload traffic to 0. In this case, the subscribed dedicated APN-AMBR used by the SGSN to negotiate the QoS parameter with the TOF does not include the subscribed APN-AMBR of the GGSN, because the value is already 0. The SGSN calculates the sum of all APN-AMBR parameters configured in the GGSN and the APN-AMBRs configured in the TOF, compares the sum with the subscribed UE-AMBR, and sends the smaller value to the RNC.

In the embodiment, the SGSN includes an AMBR negotiating module and an AMBR sending module. The AMBR negotiating module is configured to negotiate AMBR parameters with the TOF entity and the GGSN respectively, where the negotiation includes UE-AMBR negotiation and APN-AMBR negotiation. For the specific negotiation procedure, reference can be made to the third embodiment. The AMBR sending module is configured to send the calculated UE-AMBR to the RNC at the RAN side so as to perform air interface rate control at the RAN side.

An eighth embodiment describes a specific embodiment in which the TOF obtains a subscribed UE-AMBR suitable for air interface rate control at the RAN side through an Operation, Administration, and Maintenance (OAM, Operation, Administration, and Maintenance) system or a Policy Control and Charging Rules Function (PCRF, Policy Control and Charging Rules Function).

In a first method, the UE-AMBR is obtained through an OAM system, which specifically includes the following.

The TOF entity obtains subscribed configuration information of a UE from a home subscriber server (HSS, Home Subscriber Server) of the OAM system.

Specifically, the method includes the following steps:

Step 811: The TOF obtains, from the HSS of the OAM, the subscribed UE-AMBR and a virtual subscribed APN-AMBR that is used for the TOF entity. The virtual APN-AMBR refers to subscription information added in a network where a TOF entity is deployed. It has no effect on a network without a TOF.

Step 812: The TOF obtains the UE-AMBR in the RAB Assignment Request sent by the SGSN to the RNC in a RAB assignment procedure. The TOF configures the APN-AMBR, which is also referred to as O-AMBR, for the TOF according to the virtual APN-AMBR for the TOF entity. The TOF entity sends the min (the subscribed UE-AMBR, UE-AMBR in the message+O-AMBR) to the RAN. That is, the TOF compares the subscribed UE-AMBR with the sum of the UE-AMBR and the O-AMBR configured in the TOF entity, and sends the smaller value to the RAN as the UE-AMBR to perform air interface rate control.

In the embodiment, the steps in which the TOF entity obtains the AMBR information, calculates the AMBR information, and sends the calculated AMBR information to the RAN respectively correspond to an AMBR obtaining module, an AMBR calculating module, and an AMBR sending module in the apparatus embodiment of the present invention.

The virtual subscribed APN-AMBR may be a piece of new subscription information that is added in the HSS when a UE subscribes to the TOF entity service, and an original subscribed APN-AMBR is reduced, so that the original APN-AMBR=the virtual subscribed APN-AMBR+the reduced subscribed APN-AMBR. No effect is posed on the UE that do not subscribe to the TOF service.

In a second method, the UE-AMBR is obtained through a PCRF, which specifically includes the following.

The TOF entity provides an interface that is to the PCRF to obtain the subscription configuration of the UE from the PCRF.

The specific steps are included as follows:

Step 821: After the PCRF receives the subscribed APN-AMBR of the GGSN, the PCRF determines the granted APN-AMBR and delivers the granted APN-AMBR to the GGSN and the TOF entity. The parameters delivered to the TOF entity include at least one of the subscribed UE-AMBR, the subscribed APN-AMBR, and the APN-AMBR granted to the GGSN, or the PCRF delivers, to the TOF entity, at least one parameter of the subscribed UE-AMBR and the difference that is obtained through the subscribed APN-AMBR minus the granted APN-AMBR, or the PCRF delivers, to the TOF entity, at least one parameter of the subscribed UE-AMBR and the APN-AMBR granted to the TOF entity. Or the PCRF sends, to the GGSN, at least one parameter of the APN-AMBR granted to the TOF entity and the APN-AMBR granted to the GGSN.

Step 822: The TOF entity receives the parameters sent by the PCRF, configures the APN-AMBR, and adds the APN-AMBR to the UE-AMBR received from the SGSN. The TOF compares the sum of the APN-AMBR and the UE-AMBR received from the SGSN with the subscribed UE-AMBR and sends the smaller value thereof to the RAN for air interface rate control.

With respect to the method embodiments, an embodiment of the present invention further provides a TOF entity which specifically includes an AMBR obtaining module, an AMBR calculating module, and an AMBR sending module. The functions of the modules are as follows:

The AMBR obtaining module is configured to for the TOF entity to obtain a message that includes a UE-AMBR and is sent by the SGSN to the RAN or a message that includes a UE-AMBR and is sent by the PCRF. The specific message is provided in the message procedures in the method embodiments.

The AMBR calculating module is configured to for the TOF entity to calculate an AMBR parameter according to the AMBR information obtained by the AMBR obtaining module. For the specific AMBR parameter and the calculating method, reference can be made to the method embodiments.

The AMBR sending module is configured to for the TOF entity to send the AMBR parameter calculated by the AMBR calculating module to the RAN for the RAN to execute air interface rate control.

In the embodiments of the present invention, the subscribed APN-AMBR shared by the TOF and the GGSN is the APN-AMBR shared by the PDP bearers corresponding to the PDN connection shared by the TOF and the GGSN.

In the embodiments of the present invention, the TOF entity is served as a logical function which may be integrated into an RNC, an HNB, or an HNB GW in a UMTS network, or integrated into a Serving Gateway (S-GW), a Home evolved NodeB (HeNB) or an eNB in an LTE network. In addition, the TOF may be deployed alone on the interface between eNB and MME or the interface between eNB and S-GW.

Those skilled in the art understand that the accompanying drawings illustrate the exemplary embodiments of the present invention and that the modules or procedures in the accompanying drawings may be probably not necessary in the implementation of the present invention.

Those skilled in the art understand the modules of the apparatuses in the embodiments of the present invention may be distributed in the apparatuses as described in the embodiments of the present invention or distributed in one or more apparatuses different from the apparatuses described in the embodiments of the present invention. The modules in the embodiments of the present invention can be combined into one module for the ease of manufacturing or further decomposed to more submodules or units according to the needs of design or layout.

The sequence numbers of the embodiments are only for description purposes and do not imply the superiority or inferiority of the embodiments.

Those skilled in the art understand that all or part of the steps in the methods of the embodiments of the present invention can be implemented by program instructing relevant hardware. The program may be stored in a computer readable storage medium and when the program is executed, the steps in the methods of the embodiments of the present invention are executed. The storage medium may be any medium that can store program codes, such as a Read Only Memory (ROM), a Random Access Memory (RAM), a magnetic disk, or a Compact Disk-Read Only Memory (CD-ROM).

Although the present invention has been described in detail through some exemplary embodiments, the present invention is not limited to such embodiments. It is apparent that those skilled in the art can make various modifications and variations to the invention without departing from the spirit and scope of the present invention. The present invention is intended to cover the modifications and variations provided that they fall within the protection scope defined by the claims or their equivalents.

What is claimed is:

1. A method for maintaining traffic continuity, the method comprising:

receiving, by a Traffic Offload Function (TOF) entity, a downlink packet of offload traffic of a User Equipment (UE) sent by a Packet Data Network (PDN);

sending, by the TOF entity, a Core Network (CN) paging message to the UE;

receiving, by the TOF entity, a paging response sent by the UE to the CN, wherein the paging response comprises a service request message of the UE, the service request message comprising a Service Type field indicating the paging response;

modifying, by the TOF entity, the Service Type field, wherein the modified Service Type field is used to indicate Data; and forwarding, by the TOF entity, the service request message to the CN, the service request message being used by the CN to set up a Radio Access Bearer (RAB) after the forwarded service request message is received.

2. The method according to claim 1, wherein, before the sending the CN paging message to the UE, the method further comprises determining, by the TOF entity, that the UE is in an idle state.

3. The method according to claim 1, wherein, before the sending the CN paging message to the UE, the method further comprises requesting, by the TOF entity, a CN node to deliver a paging parameter, and wherein sending the CN paging message to the UE comprises sending, by the TOF entity, a paging message that includes the paging parameter to an access network that sends the paging message to the UE according to the paging parameter.

4. The method according to claim 3, wherein the CN node includes a Serving GPRS Support Node (SGSN) or a Mobility Management Entity (MME).

5. The method according to claim 1, wherein, before the sending the CN paging message to the UE, the method further comprises sending, by the TOF entity, TOF dedicated information to the Serving GPRS Support Node (SGSN) and receiving, by the TOF entity, a paging parameter, wherein the paging parameter is sent by the SGSN according to the TOF dedicated information reported by the TOF; and wherein sending the CN paging message to the UE comprises sending, by the TOF entity, a paging message that includes the paging parameter to an access network which sends the paging message to the UE according to the paging parameter.

6. The method according to claim 5, wherein the TOF dedicated information comprises any one or any combination of traffic offload capability, a traffic offload equipment identity (TOF ID), TOF address, and security capability information.

7. The method according to claim 5, wherein the paging parameter comprises any one or any combination of core network discontinuous reception (CN DRX), Paging Area ID, non-Closed Subscriber Group (CSG) List, and Temporary Mobile Subscriber Identity (TMSI).

8. A Traffic Offload Function (TOF) apparatus, comprising:
- a transceiver, configured to send a Core Network (CN) paging message to a User Equipment (UE) and to receive a paging response sent by the UE to the CN, wherein the paging response comprises a service request message of the UE, the service request message comprises a Service Type field indicating the paging response; and
- a processor, configured to modify the Service Type field, the modified Service Type field being used to indicate Data, the processor further configured to forward the service request message to the CN, the service request message being used by the CN to set up a Radio Access Bearer (RAB) after the forwarded service request message is received.

9. The TOF apparatus according to claim 8, wherein the processor is further configured to request a paging parameter from a CN node, wherein the paging initiating module is further configured to send a paging message that includes the paging parameter to an access network which sends the paging message to the UE according to the paging parameter.

10. The TOF apparatus according to claim 9, wherein the CN node includes a Serving GPRS Support Node (SGSN) or a Mobility Management Entity (MME).

11. The TOF apparatus according to claim 9, wherein the paging parameter comprises any one or any combination of core network discontinuous reception (CN DRX), Paging Area ID, non-Closed Subscriber Group (CSG) List, and Temporary Mobile Subscriber Identity (TMSI).

12. The TOF apparatus according to claim 8, wherein the processor is further configured to determine that the UE is in an idle state before the transceiver sends the CN paging message to the UE.

13. A Core Network (CN) node, comprising:
- a receiver, configured to receive a service request message from a Traffic Offload Function (TOF) entity, wherein the service request message is forwarded by the TOF entity from a User Equipment (UE) to the CN node and the service request message is sent by the UE in response to a CN paging message sent by the TOF entity, the service request message sent by the UE comprises a Service Type field indicating the paging response, the Service Type field is modified by the TOF entity to indicate Data; and
- a processor, configured to set up a Radio Access Bearer (RAB) between the CN node and the UE after receiving the service request message.

14. The CN node according to claim 13, wherein the CN node comprises a Serving GPRS Support Node (SGSN) or a Mobility Management Entity (MME).

* * * * *